United States Patent [19]

Chinomi

[11] Patent Number: 5,573,219
[45] Date of Patent: Nov. 12, 1996

[54] LIFTER MOUNTING STRUCTURE ON SEAT SLIDE RAIL

[75] Inventor: Isamu Chinomi, Ayase, Japan

[73] Assignee: Ikeda Bussan Co., Ltd., Ayase, Japan

[21] Appl. No.: 364,222

[22] Filed: Dec. 27, 1994

[30] Foreign Application Priority Data

Dec. 28, 1993 [JP] Japan .................................. 5-335015

[51] Int. Cl.⁶ ................................................ F16M 13/00
[52] U.S. Cl. .......................................... 248/421; 248/429
[58] Field of Search .................................... 248/421, 419, 248/396, 157, 394, 424, 429

[56] References Cited

U.S. PATENT DOCUMENTS

| | | | |
|---|---|---|---|
| 3,149,815 | 9/1964 | Cotter et al. | 248/421 |
| 4,422,611 | 12/1983 | Kitsuda | 248/421 |
| 4,643,383 | 2/1987 | Fukuta et al. | 248/396 |
| 4,721,277 | 1/1988 | Hessler et al. | 248/393 |
| 4,781,353 | 11/1988 | Nishino | 248/395 |
| 5,020,762 | 6/1991 | Hatta | 248/394 |
| 5,292,164 | 3/1994 | Rees | 296/65.1 |

FOREIGN PATENT DOCUMENTS

6-107055  4/1994  Japan .

*Primary Examiner*—Karen J. Chotkowski
*Assistant Examiner*—Anita M. King
*Attorney, Agent, or Firm*—Foley & Lardner

[57] ABSTRACT

A lifter mounting structure for mounting a seat lifter on a seat slide rail unit consists of a lower stationary guide rail rigidly mounted on an automotive floor panel and an upper slidable guide rail having a sliding-contact section slidably fitted to the lower stationary guide rail, comprises a mounting bracket tightly fitted to the upper slidable guide rail and having a pair of opposing side wall section. A laterally extending shaft member is provided beneath a bottom of the seat and rotatably linked to the upper slidable guide rail through the mounting bracket. A seat support link is disposed between the laterally extending shaft member and the bottom of the seat for moving the seat upwardly and downwardly and has a substantially C-shaped member formed with a pair of opposing side wall sections. The lifter mounting structure includes a positioning structure for positioning the seat support link to the mounting bracket. The positioning structure includes a pivotal hole formed at one of the side wall sections of the mounting bracket and one shaft end of the laterally extending shaft member, which is inserted into the pivotal hole.

3 Claims, 2 Drawing Sheets

5,573,219

LIFTER MOUNTING STRUCTURE ON SEAT SLIDE RAIL

BACKGROUND OF THE INVENTION

1. Field of the Invention

The present invention relates to a seat slide rail with a seat lifter by means of which the seat can move up and down, and specifically to a lifter mounting structure that is optimally applied for a seat lifter mounted on an automobile seat slide rail unit, which consists of an upper slidable guide rail facing the bottom of the seat and a lower stationary guide rail rigidly mounted on the floor panel of the vehicle body, the upper and lower guide rails slidably fitted to each other so that the position of the seat relative to the floor is adjusted frontwards and backwards.

2. Description of the Prior Art

Recently, there have been proposed and developed various automobile seat slides equipped with a seat lifter. For instance, the conventional seat slide with the seat lifter has a lifter mounting structure as shown in FIG. 4. With regard to one seat slide rail unit 3, two seat lifters or seat lifting mechanisms 4 are placed at front and back ends of the seat slide rail unit 3, which has an upper slidable guide rail 2 facing the bottom frame 5 of the seat and a substantially C-shaped lower stationary guide rail 1 rigidly mounted on the vehicle body. In general, four seat lifters are placed at the respective front-left, front-right, rear-left and rear-right positions on the upper slidable guide rails, since two seat slide rail units are traditionally used for slidably supporting the seat. As seen in FIG. 4, the seat lifter 4 is generally fixed onto the upper surface of the upper slidable guide rail 2. As appreciated from the lifter mounting structure shown in FIG. 4, since the lifter 4 is simply put on the upper surface of the upper guide rail 2, the conventional structure requires an undesirably great amount of space enough to mount the lifter on the guide rail 2 in a vertical direction of the seat. As a result, the initial set-position of the seat is comparatively high. To avoid this, another lifter mounting structure has been disclosed in Japanese Patent Provisional Publication (Tokkai Heisei) No. 6-107055, which is assigned by the same assignee as the present application. In the Japanese Patent Provisional Publication No. 6-107055, in order to minimize the lifter mounting space, each seat support link constructing an essential part of the seat lifter is arranged to cover a substantially upper half of the upper slidable guide rail so that the lower portion of the seat support link and the upper portion of the slidable guide rail are overlapped with each other. However, the conventional lifter mounting structure disclosed in the above-noted Japanese Patent Provisional Publication suffers from the drawback in that the positioning of the respective seat support link is troublesome when assembling each seat support link on the associated upper slidable guide rail. Thus, it is desirable to enhance an efficiency of assembling the seat lifter on the upper guide rail.

SUMMARY OF THE INVENTION

Accordingly, it is an object of the invention to provide an improved lifter mounting structure for a seat slide with a seat lifter that avoids the foregoing disadvantages of the prior art.

It is an object of the invention to provide a lifter mounting structure for a seat slide with a seat lifter capable of facilitating assembly task of the lifter on the guide rail, while minimizing a space necessary to mount the lifter on the guide rail.

In order to accomplish the aforementioned and other objects of the invention, a lifter mounting structure for mounting a seat lifter on at least one pair of seat slide rail unit consisting of a lower stationary guide rail rigidly mounted on a floor panel and an upper slidable guide rail having a sliding-contact section slidably fitted to the lower stationary guide rail, comprises a mounting bracket tightly fitted to the upper slidable guide rail and having a pair of opposing side wall member laterally extending shaft member provided beneath a bottom of the seat. The laterally extending shaft member is rotatably linked to the upper slidable guide rail through the mounting bracket. A seat support link is disposed between the laterally extending shaft member and the bottom of the seat, for moving the seat upward and downward. The seat support link has a substantially C-shaped member formed with a pair of opposing side wall sections. Means for positioning the seat support link to the mounting bracket is also provided. The positioning means includes a pivotal hole formed at one of the side wall sections of the mounting bracket and one shaft end of the laterally extending shaft member integrally fixed to one side wall section of the C-shaped member and loosely fitted to the pivotal hole. The shaft end of the laterally extending shaft member is integrally fixed to the one side wall section of the C-shaped member in such a manner that the shaft end penetrates through the one side wall section of the C-shaped member by a predetermined length for positioning the seat support link relative to the mounting bracket by slightly inserting the shaft end into the pivotal hole of one side wall section of the mounting bracket. The other side wall section of the C-shaped member is pivotally received in a pivotal hole formed at the other side wall section of the mounting bracket by rotatably mounting the other side wall section of the C-shaped member on the other side wall section of the mounting bracket through a bolt having a shorter length than the predetermined length, under a condition in which the shaft end is completely inserted into the pivotal hole of the one side wall section of the mounting bracket.

According to another aspect of the invention, a lifter mounting structure for mounting a seat lifter on at least one pair of seat slide rail unit consisting of a lower stationary guide rail rigidly mounted on a floor panel and an upper slidable guide rail having a sliding-contact section slidably fitted to the lower stationary guide rail and a straight flat plate section vertically extending from the sliding-contact section, comprises a mounting bracket tightly fitted to the vertically extending flat plate section and having a pair of opposing side wall sections disposed at both sides of the vertically extending flat plate section. A laterally extending shaft member is provided beneath a bottom of the seat. The laterally extending shaft member is rotatably linked to the upper slidable guide rail through the mounting bracket, and a seat support link is disposed between the laterally extending shaft member and the bottom of the seat for moving the seat upward and downward. The seat support link has a substantially C-shaped member whose opening end is directed downwardly for partly covering the vertically extending flat plate section. Each side wall section of the mounting bracket has a pivotal hole so that the side wall sections of the seat support link are rotatably linked to the side wall sections of the mounting bracket. One shaft end of the laterally extending shaft member is integrally fixed to one side wall section of the C-shaped member in such a manner that the shaft end penetrates through the one side wall section of the C-shaped member by a predetermined length for positioning the seat support link relative to the mounting bracket by inserting the shaft end into the pivotal hole of one side wall section of the mounting bracket. The other side wall section of the C-shaped member is pivotally received in the pivotal hole of the other side wall section of the mounting bracket by rotatably mounting the other side wall section of the C-shaped member on the other side wall section of the mounting bracket through a bolt having a shorter length than the predetermined length, under a condition in which the shaft end is completely inserted into the pivotal hole of the one side wall section of the mounting bracket. The bolt preferably consists of a stepped bolt having a head portion, a threaded portion, a non-threaded portion, which has a greater diameter than the threaded portion and a length greater than the sum of a thickness of the other side wall section of the mounting bracket and a thickness of the other side wall section of the C-shaped member of the support link. The non-threaded portion is loosely fitted to the other side wall section of the mounting bracket to permit a pivotal movement of the support link relative to the mounting bracket.

DESCRIPTION OF THE PREFERRED EMBODIMENTS

Figure 1:
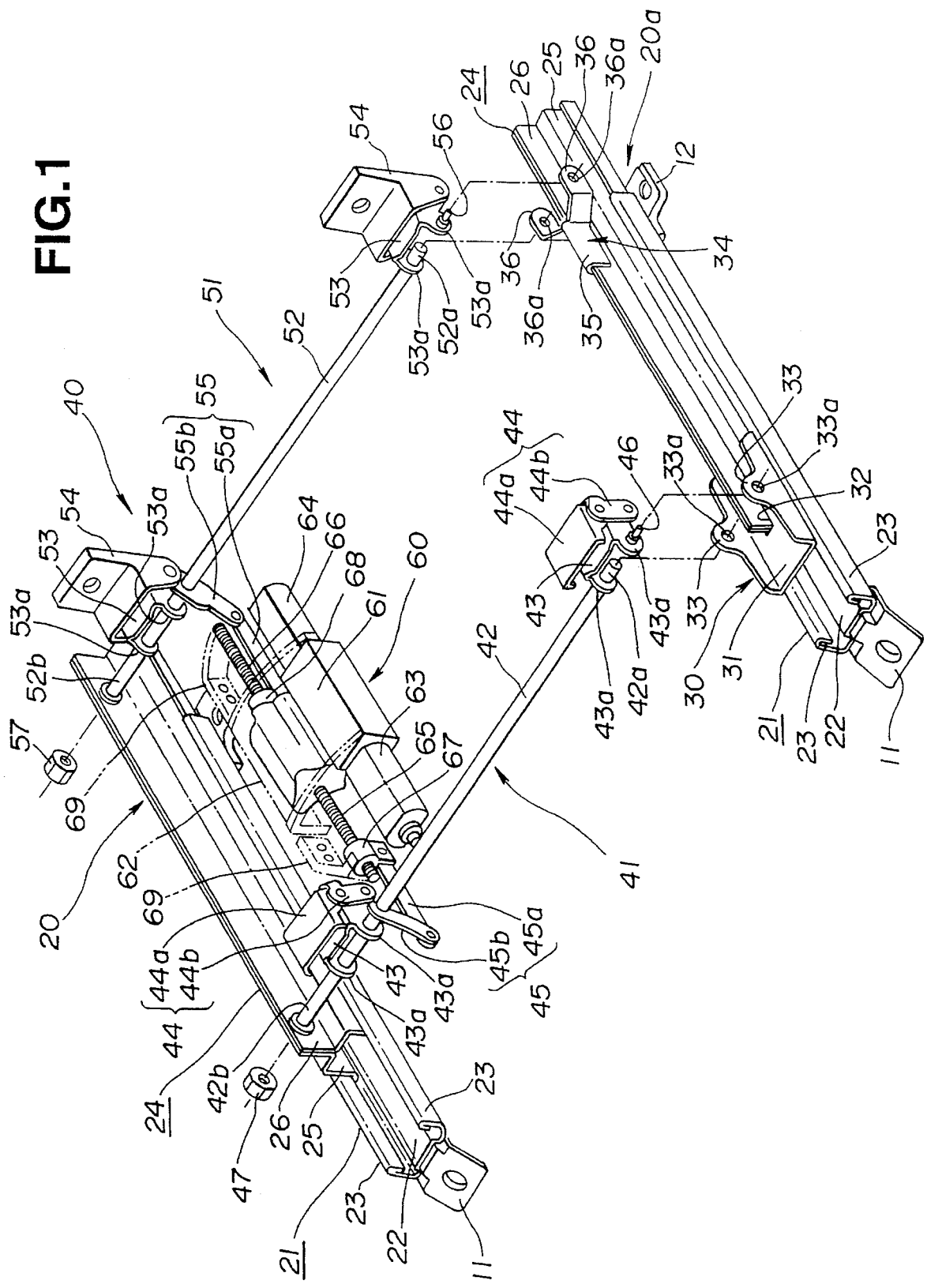
FIG. 1 is an exploded perspective view illustrating one embodiment of a seat lifter mounting structure according to the invention.

Referring now to the drawings, particularly to FIG. 1, the seat lifter mounting structure of the invention is exemplified in case of an automobile seat slide with a seat lifter. As seen in FIG. 1, the seat lifting mechanism or seat lifting device 40 is mounted on a pair of seat slide rail units 20 and 20a, so as to move the seat in its vertical direction for the purpose of adjusting the vertical position of the seat cushion. Each of the rail units 20 and 20a has a lower stationary guide rail 21, which is firmly secured onto the floor of the vehicle body by means of front and rear leg members 11 and 12, and an upper slidable guide rail 24 slidably fitted to the lower stationary guide rail 21 and facing the bottom of the seat. The lower guide rail 21 consists of a substantially C-shaped channel bar or a substantially C-shaped bending member. As shown in FIG. 1, the lower guide rail 21 includes a bottom wall section 22 and a pair of side wall sections 23. On the other hand, the upper slidable guide rail 24 includes a sliding-contact section 25 slidably fitted to the lower stationary guide rail 21 and a straight flat plate section 26 vertically extending from the slide-contact section 25. Although it is not shown, the seat slide may comprise a powered seat slide powered by way of an electrical motor.

Figure 2:
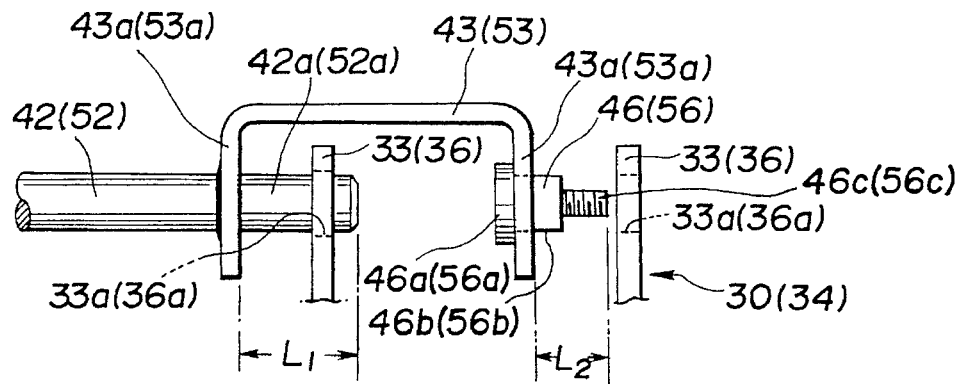
FIG. 2 is a partially enlarged elevation view illustrating an essential part of the lifter mounting structure of the embodiment during assembling the seat support link of the lifter on the upper guide rail.
Figure 3:
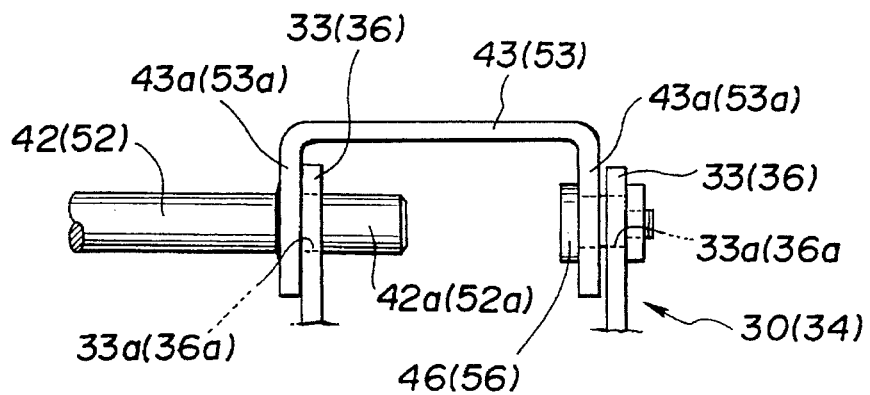
FIG. 3 is a partially enlarged elevation view illustrating the essential part of the lifter mounting structure after assembling the seat support link of the lifter on the upper guide rail.
Figure 4:
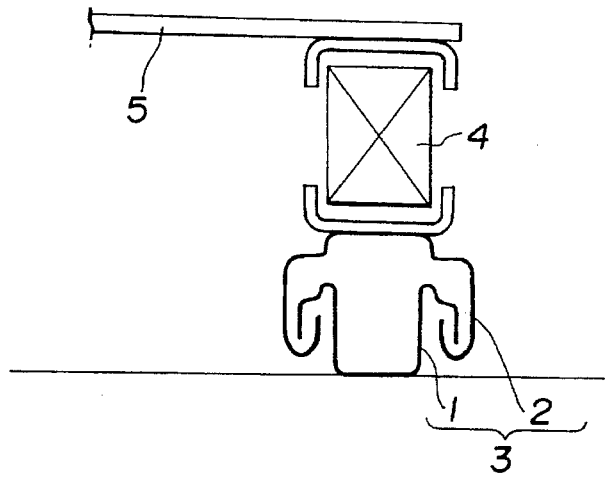
FIG. 4 is a partially enlarged elevation view illustrating an essential part of the prior art lifter mounting structure.

As seen in the lower-right section of FIG. 1, a pair of mounting brackets 30 and 34 are fixedly connected onto the upper slidable guide rail 24 constructing one rail unit 20a, so that the front mounting bracket 30 is fitted to the root of the front end of the vertically extending straight flat plate section 26 of the upper guide rail 24, and the rear mounting bracket 34 covers the edge of the vertically extending straight flat plate section 26 in the vicinity of the rear end thereof. These brackets 30 and 34 are provided for supporting the left half of the lifting device 40. In more detail, the front bracket 30 includes a base section 31 and a pair of support-link mounting side wall sections 33 bent upwardly at both sides of the base section 31. The base section 31 of the front bracket 30 is formed with a substantially rectangular cut-out 32 fitted to the root of the front end of the straight flat plate section 26. Each side wall section 33 has a pivotal hole 33a provided for pivotally supporting a shaft or a pin. The rear bracket 34 has a substantially U-shaped base section 35 and a pair of opposing support-link mounting L-shaped tab-like sections 36 backwardly extending from the U-shaped base section 35. The rear bracket 34 is fixed to the rear end of the straight flat plate section 26 such that the U-shaped base section 35 tightly fits onto the upper edge of the straight flat plate section 26. In actual, the base section 31 of the front mounting bracket 30 and the base section 35 of the rear mounting bracket 34 is generally fixed onto the upper guide rail 24 by way of riveting, spot-welding or the like. Each of the tab-like sections 36 of the rear bracket 34 has a pivotal hole 36a in the same manner as the side wall sections 33 of the front bracket 30. The lifting device 40 includes a front lifter 41 arranged beneath the front end of the seat for the purpose of front-end height adjustment, and a rear lifter 51 arranged beneath the rear end of the seat for the purpose of rear-end height adjustment, and a lifter drive unit 60 having a drive connection with the respective lifters 41 and 51. The front lifter 41 includes a laterally extending shaft member 42 provided between the straight flat plate section 26 of the upper slidable guide rail 24 of the right-hand side rail unit 20 and the straight flat plate section 26 of the upper slidable guide rail 24 of the left-hand side rail unit 20a. A pair of seat support links 43 are mechanically linked to the shaft member 42 so that the support links 43 are pivotable by way of rotation of the shaft member 42. A pair of connecting links 44 each are provided between the support link 43 and the bottom of the seat so that the pivotal section of the support link 43 and the bottom frame of the seat are mechanically linked to each other. A power transmission link 45 is disposed between the drive unit 60 and the front shaft member 42 for transmitting power created by the drive unit 60 to the shaft member 42 to cause rotation of the shaft member 42. The respective support link 43 is C-shaped in cross section. The support link 43 includes two opposing side wall sections 43a fixedly connected to the shaft member 42 for co-rotation together therewith. As seen in FIG. 1, the left-hand side C-shaped support link 43, which is provided close to the left-hand side rail unit 20a, is arranged to cover the front end of the straight flat plate section 26. As best seen in FIG. 2, the inside wall section 43a of the left-hand side C-shaped support link 43 is integrally fixed to the left end of the shaft member 42 in such a manner that the left end 42a of the shaft member 42 penetrates through the inside wall section 43a of the support link 43 by a predetermined distance or length $L_1$. After assembling, the left end 42a is loosely fitted into the pivotal hole 33a of the inside wall section 33 of the front bracket 30 and pivotally mounted on the inside wall section 33 of the front bracket 30, as illustrated in FIG. 3. On the other hand, the outside wall section 43a of the left-hand side C-shaped support link 43 is loosely fitted into the pivotal hole 33a of the outside wall section 33 of the front bracket 30 and pivotally mounted on the outside wall section 33 of the front bracket 30 by means of a stepped bolt 46. As set forth above, the support link 43 is pivotally mounted on the front bracket 30 through the left end 42a of the shaft member 42 and the stepped bolt 46. That is, the left-hand side shaft end 42a and the stepped bolt 46 are mechanically linked to the support link 43 to serve as a pivot shaft of the latter and to cause the pivotal movement of the rear end portion of the support link 43. As seen in FIGS. 2 and 3, the stepped bolts 46 and 56 consist of a head portion 46a, 56a, a relatively larger-diameter non-threaded portion 46b, 56b and a relatively smaller-diameter threaded portion 46c, 56. The length of the non-threaded portion is so dimensioned to be slightly greater than the sum of the thickness of the side wall section of the support link 43 and the thickness of the side wall section of the mounting bracket 30. The non-threaded portion is loosely fitted into the pivotal hole 33a of the side wall section 33 of the mounting bracket 30 so as to permit a pivotal movement of the support link 43 with respect to the mounting bracket 30. It is preferable that the non-threaded portion be tightly fitted to a hole formed at the other side wall 43a of the support link 43 so as to minimize a play of the seat relative to the upper guide rail 24. As shown in FIG. 2, the insertion length $L_1$ of the left end 42a (52a) extending laterally from the inside wall 43a (52a) of the support link 43 (53) is so dimensioned to be longer than a length $L_2$, which is obtained by subtracting a thickness of the side wall section 43a (53a) of the support link 43 (53) from the total length of the threaded and non-threaded portions of the stepped bolt 46, 46b (56b) and 46c (56c). During mounting of the support link 43 on the front bracket 33, the left end 42a of the shaft member 42 is first inserted into the inside wall section 33 of the front bracket 30, and thereafter the stepped bolt 46 is inserted through the outside wall section 43a of the support link 43 into the pivot hole 33a of the front bracket 33. After inserting the stepped bolt 46 into the pivot hole 33a, the bolt 46 is tightly connected onto the outside wall section 33 of the front bracket by way of a nut. That is to say, the left end 42a of the shaft member 42 is so designed and dimensioned to function as a positioning guide for the purpose of mounting the support link 43 on the bracket 30.

In contrast to the above, the right-hand side C-shaped support link 43 (53), which is provided close to the right-hand side rail unit 20, is directly fixed through its side wall sections 43a (53a) to the other end 42b (52b) of the shaft member 42 (52). The other end (right end) 42b (52b) of the shaft member (52) is coupled with the front (rear) end portion of the straight flat plate section 26 of the right-hand side upper guide rail 24 by way of a nut 47 (57) and rotatably mounted on the upper guide rail of the right-hand side rail unit 20.

The right and left support links 43 are mechanically linked with respective connecting links 44. Each connecting link 44 includes an intermediate link portion 44a rotatably connected to the pivotable rear end of the support link 43, and a seat support link portion 44b rotatably linked to the intermediate link portion 44a and fixedly connected to the bottom of the seat. The previously-noted power transmission link 45 consists of two-link portions, namely a first link portion 45a, which has a driven connection with the drive unit 60 and a second link portion 45b rotatably linked to one end of the first link 45a at its one end and fixed to the shaft member 42 at the other end.

Since the construction of the rear lifter 51 is substantially similar to that of the front lifter 41, the detailed explanation concerning the rear lifter 51 is omitted for the purpose of simplification of the disclosure. The rear lifter 51 is slightly different from the front lifter 41 in that the connecting link 54 consists of a single part, although the connecting link 44 of the front lifter 41 consists of two parts, namely the first and second link portions 44a and 44b rotatably linked to each other. As seen in FIG. 1, the rear lifter 51 includes a shaft member 52 corresponding to the shaft member 42 of the front lifter 41, a pair of seat support links 53 corresponding to the support links 43 of the front lifter, a pair of connecting links 54 corresponding to the connecting links 44 of the front lifter, and a power transmission link 55 disposed between the drive unit 60 and the rear shaft member 52. In the embodiment, the dimensions and the geometry of the power transmission link 55 of the rear lifter 51 are identical to those of the power transmission link 45 of the first lifter 41, so as to create a substantially same lifting force at the front and rear ends of the seat.

The drive unit 60 includes a gear box 61 firmly attached onto the inside wall of the straight flat plate section 26 of the right-hand side rail unit 20 by way of a bracket 62. A front-lifter driving motor 63 is operably attached to the front end of the gear box 61 and a rear-lifter driving motor 64 operably attached to the back end of the gear box 61. A front-lifter drive screw-threaded member 65 is driven by the driving motor 63 via the gear box. A rear-lifter drive screw-threaded member 66 is driven by the driving motor 64 via the gear box. A front-lifter drive nut member 67 is associated with the front screw-threaded member 65 and a rear-lifter drive nut member 68 is associated with the rear screw-threaded member 66. Each of the front and rear screw-threaded members 65 and 66 is rotatably supported by a support bracket 69. The front nut member 67 engages with the front screw-threaded member 65 to cause its axial sliding movement by way of rotation of the threaded member 65, while the rear nut member 68 engages with the rear screw-threaded member 66 to cause its axial sliding movement by way of rotation of the threaded member 66. Traditionally, the drive unit 60 is provided substantially midway between the front and rear lifters 41 and 51, so as to effectively transmit power or torque to each of the front and rear shaft members 42 and 52 through the power transmission links 45 and 55, each of which has the same dimensions and geometry. Each front and rear nut members 67 and 68 is formed with a tab-like portion (not numbered) that extends downwardly from the cylindrical nut portion. The first link portion 45a of the front power transmission link 45 is pivotally linked to the tab-like portion of the front nut member 67. Similarly, the first link portion 55a of the rear power transmission link 55 is pivotally linked to the tab-like portion of the rear nut member 68. With the above arrangement, the sliding movement of the front nut member 67 causes a rotational movement of the front shaft member 42, consequently providing a lifting action of a front-side linkage by the three link members 43, 44a and 44b, while the sliding movement of the rear nut member 68 causes a rotational movement of the rear shaft member 52, consequently providing a lifting action of a rear-side linkage by the two link members 53 and 54. In FIG. 1, when the front-lifter driving motor 63 is activated and the front nut member 67 moves backwards, the second link 45b of the power transmission link 45 rotates in its counterclockwise direction (viewing FIG. 1). In this case, the rear pivotal end of the support link 43 lifts up and thus the connecting link 44 also lifts up. The lifting-up motion of the connecting link 44 results in a lifting-up motion of the front end of the seat cushion. In the event that the rear-lifter driving motor 64 is activated and the rear nut member 68 moves backwards, the counterclockwise motion of the second link 55b of the power transmission link 55 causes the lifting-up motion of the connecting link 54. In this manner, the height adjustment at the front and rear ends of the seat cushion can be achieved by way of the drive unit 60. Each of the motors 63 and 64 is reversible. The gear box 61 generally includes two worm gear sets each associated with one of the reversible motors 63 and 64.

When assembling the seat lifting device 40 on a pair of rail units 20 and 20a, first of all, the front-left bracket 30 is installed on the front end of the straight flat plate section 26 of the upper guide rail 24 of the left-hand side rail unit 20a. Likewise, the rear-left bracket 34 is installed on the rear end of the straight flat plate section 26 of the left-hand side rail unit 20a. Thereafter, when installing the front and rear shaft members 42 and 52 respectively constructing the front and rear lifters 41 and 51, the left end 42a of the front shaft member 42 and the left end 52a of the rear shaft member 52 are slightly inserted into the pivotal hole 33a of the inside wall section 33 of the front bracket 30 and the pivotal hole 36a of the inside L-shaped tab-like section 36 of the rear bracket 34, respectively. In this manner, the relatively longer shaft ends 42a and 52a are advantageous to ensure the positioning of the seat support links 43 and 53 to the front and rear brackets 30 and 34. The more the shaft ends 42a and 52a are inserted through the pivot holes 33a and 36a of the respective inside wall sections 33 and 36, the more the outside side wall sections 43a and 53a of the support links 43 and 53 approach to the outside wall sections 33 and 36 of the respective front and rear brackets 30 and 34. When the outside wall sections 43a and 53a of the support links 43 and 53 are in close proximity to the side wall sections 33 and 36 of the front and rear brackets 30 and 34 after the inside wall sections 43a and 53a are brought into contact with the inside wall sections 33 and 36 respectively, the outside wall sections 43a and 53a of the support links 43 and 53 are rotatably connected to the outside wall sections 33 and 36 of the front and rear brackets 30 and 34 by means of the stepped bolts 46 and 56. In this manner, when mounting the two opposing side wall sections 43a and 53a of the front and rear support links 43 and 53 on the opposing two side wall sections 33 and 36 of the front and rear brackets 30 and 34, only the outside wall sections 43a and 53a to the outside wall sections 33 and 36 have to be connected by means of the stepped bolts 46 and 56, after the inside wall sections 43a and 53a are temporarily connected to the inside wall sections 33 and 36 by means of the shaft ends 42a and 52a, each of which has a longer insertion length $L_1$ than the entire length $L_2$ of the threaded and non-threaded portions of the stepped bolt 46 and 56.

The above-noted temporary connections between the front shaft end 42a and the pivotal hole 33a of the inside wall section 33 and between the rear shaft end 52a and the pivotal hole 36a of the inside wall section 36 result in easy connection between the outside wall sections 43a and 33 via the bolt 46 and easy connection between the outside wall sections 53a and 36 via the bolt 56, and whereby the working efficiency of the mounting work of the lifting device 40 on the seat slide rail units 20 and 20a is enhanced.

On the other hand, the right shaft ends 42b and 52b facing the right-hand side rail unit 20, can be easily connected to the straight flat plate section 26 of the upper guide rail 24 of the right-hand side rail unit 20, after or before installation of the left shaft ends 42a and 52a facing the left-hand side rail unit 20a on the inside wall sections 33 and 36 of the front and rear brackets 30 and 34.

Furthermore, since the support links 43 and 53 are pivotally supported at both ends with a relatively wide distance substantially identical to the entire width of the upper guide rail 24 and the front and rear brackets 30 and 34 are firmly fitted onto the upper guide rail, the mounting structure for the support links 43 and 53 on the left-hand side rail unit 20a has a higher rigidity as compared with the mounting structure for the support links 43 and 53 on the right ends 42b and 52b of the shaft members 42 and 52. Also, since the front support link 43 is provided to tightly fit onto the front end of the straight flat plate section 26 of the upper guide rail 24 and the rear support link 53 is provided to tightly fit onto the upper edge of the rear end of the straight flat plate section 26 of the upper guide rail 24, and additionally the connecting links 44 and 54 are provided to cover the upper edge of the straight flat plate section 26 of the upper guide rail 24, the bottom frame 5 of the seat can be provided substantially at the same level as the upper edge of the straight flat plate section 26. As explained above, the lifter mounting structure according to the invention assures a minimum possible mounting space necessary to mount the lifting device on the seat rail units.

In the embodiment, although the lifter mounting structure of the present invention is applied to mount the left half of the lifting device 40 on the left-hand side rail unit 20a, the lifter mounting structure may be applied to mount to the right half of the lifting device 40 on the right-hand side rail unit 20.

As will be appreciated from the above, according to the lifter mounting structure of the present invention, the substantially C-shaped seat support links 43 and 53 of the lifting device 40 are provided to partly cover the upper edge section of the vertically extending straight flat plate section 26 of the upper guide rail 24, after fixedly connecting the mounting brackets 30 and 34, each having a pair of support-link mounting wall sections at its both sides, onto the upper guide rail so that the both brackets 30 and 34 fit to the vertically extending straight flat plate section of the upper guide rail. In addition, the shaft end 42a or 52a, which extends between the two opposing side walls of the seat support link, is so designed and dimensioned to function as a positioning guide necessary for a precise and easy positioning of the seat support link to the mounting bracket by inserting the shaft end into the pivotal hole of one support-link mounting side wall section of the mounting bracket. In other words, during assembling the lifter device on the rail units, the mounting bracket and the shaft end are cooperative to each other to assure the easy and rapid positioning of the support link onto the upper guide rail. Accordingly, the lifter mounting structure of the present invention can improve the working efficiency of automotive seat slide rails with a seat lifter and reducing manufacturing costs.

While the foregoing is a description of the preferred embodiments of the invention, it will be understood that the invention is not limited to the particular embodiments shown and described herein, but that various changes and modifications may be made without departing from the scope or spirit of this invention as defined by the following claims.

What is claimed is:

1. A lifter mounting structure adapted for mounting a seat lifter, comprising:

at least one pair of seat slide rail unit on which the seat lifter is to be mounted, the seat slide rail unit including a lower stationary guide rail adapted for rigidly mounting to a floor panel and an upper slidable guide rail having a sliding-contact section slidably fitted to the lower stationary guide rail;

a mounting bracket fixedly connected to said upper slidable guide rail and having a pair of opposing side wall sections;

a laterally extending shaft member adapted to be provided beneath a bottom of a seat, said laterally extending shaft member being rotatably linked to said upper slidable guide rail through said mounting bracket;

a seat support link disposed between said laterally extending shaft member and the bottom of the seat for moving the seat upwardly and downwardly, said seat support link having a substantially C-shaped member formed with a pair of opposing side wall sections; and means for positioning said seat support link to said mounting bracket, said positioning means including a pivotal hole formed at one of said side wall sections of said mounting bracket and one shaft end of said laterally extending shaft member being integrally fixed to one side wall section of said C-shaped member of said support link and loosely fitted to said pivotal hole, wherein said shaft end of said laterally extending shaft member is integrally fixed to said one side wall section of said C-shaped member such that said shaft end penetrates through said one side wall section of said C-shaped member by a predetermined length for positioning said seat support link relative to said mounting bracket by slightly inserting said shaft end into said pivotal hole of said one side wall section of said mounting bracket, and wherein the other side wall section of said C-shaped member is pivotally received in a pivotal hole formed at the other side wall section of said mounting bracket by rotatably mounting the other side wall section of said C-shaped member on the other side wall section of said mounting bracket through a bolt having a shorter length than said predetermined length, under a condition in which said shaft end is completely inserted into said pivotal hole of said one side wall section of said mounting bracket.

2. A lifter mounting structure adapted for mounting a seat lifter, comprising:

at least one pair of seat slide rail unit on which the seat lifter is to be mounted, said seat slide rail unit including a lower stationary guide rail adapted for rigidly mounting to a floor panel and an upper slidable guide rail having a sliding-contact section slidably fitted to the lower stationary guide rail, and a straight flat plate section vertically extending from the sliding-contact section;

a mounting bracket fixedly connected to said straight flat plate section and having a pair of opposing side wall sections disposed at both sides of said straight flat plate section;

a laterally extending shaft member adapted to be provided beneath a bottom of a seat, said laterally extending shaft member rotatably linked to said upper slidable guide rail through said mounting bracket; and a seat support link disposed between said laterally extending shaft member and the bottom of the seat for moving the seat upwardly and downwardly, said seat support link having a substantially C-shaped member whose opening end is directed downwardly for partly covering said straight flat plate section;

wherein each side wall section of said mounting bracket has a pivotal hole so that said side wall sections of said seat support link are rotatably linked to said side wall sections of said mounting bracket, wherein one shaft end of said laterally extending shaft member is integrally fixed to one side wall section of said C-shaped member such that said shaft end penetrates through said one side wall section of said C-shaped member by a predetermined length for positioning said seat support link relative to said mounting bracket by inserting said shaft end into said pivotal hole of said one side wall section of said mounting bracket, and wherein the other side wall section of said C-shaped member is pivotally received in said pivotal hole of the other side wall section of said mounting bracket by rotatably mounting the other side wall section of said C-shaped member on the other side wall section of said mounting bracket through a bolt having a shorter length than said predetermined length, under a condition in which said shaft end is completely inserted into said pivotal hole of said one side wall section of said mounting bracket.

3. The lifter mounting structure as set forth in claim 2, wherein said bolt comprises a stepped bolt having a head portion, a threaded portion, a non-threaded portion having a diameter greater than said threaded portion and a length greater than the sum of a thickness of the other side wall section of said mounting bracket and a thickness of the other side wall section of said C-shaped member of said support link, said non-threaded portion being loosely fitted to the other side wall section of said mounting bracket to permit a pivotal movement of said support link relative to said mounting bracket.

* * * * *